(12) United States Patent
Lee et al.

(10) Patent No.: US 8,602,467 B2
(45) Date of Patent: Dec. 10, 2013

(54) STORAGE APPARATUS FOR VEHICLE

(75) Inventors: Seung Mok Lee, Hwaseong-si (KR);
Nae Ung Jang, Hwaseong-si (KR); Hee Chan Yang, Hwaseong-si (KR); Nam Cheol Kim, Suwon-si (KR); Kwang Jae Choi, Hwaseong-si (KR); Jo Han Kim, Hwaseong-si (KR); Yong Won Jeong, Hwaseong-si (KR); Seung Hwan Lee, Hwaseong-si (KR); Cheol O Kim, Hwaseong-si (KR); Ki Tae Kim, Hwaseong-si (KR); Myung Eun Kim, Hwaseong-si (KR); Hun Soo Kim, Hwaseong-si (KR); Hoo Taek Cho, Yongin-si (KR); Dong Eun Cha, Seongnam-si (KR); Jeong Ho Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/528,190

(22) Filed: Jun. 20, 2012

(65) Prior Publication Data
US 2013/0088036 A1  Apr. 11, 2013

(30) Foreign Application Priority Data
Oct. 5, 2011 (KR) .......................... 10-2011-0101153

(51) Int. Cl.
*B61F 19/04* (2006.01)

(52) U.S. Cl.
USPC .......................................... 293/106; 296/37.1

(58) Field of Classification Search
USPC ........... 296/37.1, 62; 293/106, 117, 102, 116; 280/164.1, 166, 163
See application file for complete search history.

(56) References Cited

U.S. PATENT DOCUMENTS

| | | | | | |
|---|---|---|---|---|---|
| 3,471,070 | A | * | 10/1969 | Olson | 224/489 |
| 3,614,136 | A | * | 10/1971 | Dent | 280/500 |
| 4,570,986 | A | * | 2/1986 | Sams | 293/117 |
| 4,674,782 | A | * | 6/1987 | Helber | 293/106 |
| 4,901,895 | A | * | 2/1990 | Gancarz | 224/491 |
| 5,135,274 | A | * | 8/1992 | Dodd | 293/117 |
| 5,823,585 | A | * | 10/1998 | Tanguay | 293/106 |
| 5,868,412 | A | * | 2/1999 | Hinkle | 280/163 |
| 5,979,953 | A | * | 11/1999 | Rinehart | 293/106 |
| 6,149,181 | A | * | 11/2000 | Biederman | 280/491.1 |
| 7,377,563 | B1 | * | 5/2008 | Demick | 293/116 |
| 2013/0087590 | A1 | * | 4/2013 | Lee et al. | 224/496 |
| 2013/0087591 | A1 | * | 4/2013 | Cha et al. | 224/496 |
| 2013/0088034 | A1 | * | 4/2013 | Cha et al. | 296/37.1 |
| 2013/0088035 | A1 | * | 4/2013 | Cha et al. | 296/37.1 |

FOREIGN PATENT DOCUMENTS

| | | |
|---|---|---|
| JP | 2007-245959 A | 9/2007 |
| JP | 2010-179784 A | 8/2010 |

\* cited by examiner

*Primary Examiner* — Jason S Morrow
(74) *Attorney, Agent, or Firm* — Morgan, Lewis & Bockius LLP

(57) ABSTRACT

A storage apparatus for a vehicle can maximize a space use of a vehicle by a structure in which the storage apparatus is mounted by using an inner space of a rear bumper, in particular, greatly improving the value of commodities of the vehicle by using a bumper door as a step or a bench at the time of opening a storage case or using articles while putting the articles on the opened bumper door.

5 Claims, 3 Drawing Sheets

STORAGE APPARATUS FOR VEHICLE

1. CROSS-REFERENCE TO RELATED APPLICATION

The present application claims priority of Korean Patent Application Number 10-2011-0101153 filed Oct. 5, 2011, the entire contents of which application is incorporated herein for all purposes by this reference.

2. BACKGROUND OF INVENTION

1. Field of Invention

The present invention relates to a storage apparatus for a vehicle, and more particularly, to a storage apparatus for a vehicle capable of storing baggage or being used as a step and a bench by using an inner space of a rear bumper.

2. Description of Related Art

FIG. 1 shows a vehicle in which a space of a trunk room 1 is provided with a storage case 2. According to the related art, a structure of FIG. 1 has a structure which opens a trunk lid 3 and draws-out a storage case 2. Therefore, the structure may cause inconvenience due to an opening and a closing operation of the trunk lid 3. In addition, a space of the trunk room 1 may be polluted by moisture, or the like. In particular, an inner space of a rear bumper corresponding to a spare space may not be used as a storage structure.

Further, the storage structure of the related art shown in FIG. 2 has a structure in which a rear bump 11 is used as a door of the storage space 12. The storage structure has a structure in which the rear bump 11 is opened and then, an article 13 may be stored in a storage space 12 provided under the vehicle.

However, as shown in FIG. 2, the structure according to the related art has a structure using the rear bumper 11 as the door of the storage space 12. According to the structure of the related art shown in FIG. 1, an inner space of the rear bump 11 corresponding to a spare space is not used as the storage structure and thus, a storage function of the bumper is insufficient.

The information disclosed in this Background section is only for enhancement of understanding of the general background of the invention and should not be taken as an acknowledgement or any form of suggestion that this information forms the prior art already known to a person skilled in the art.

3. SUMMARY OF INVENTION

Various aspects of the present invention provide for a storage apparatus for a vehicle capable of positively using a spare space of the vehicle and being using an opened rear bumper as a step and a bench by using an inner space of a rear bumper corresponding to the spare space of the vehicle as a storage structure.

Various aspects of the present invention provide for a storage apparatus for a vehicle that includes: a storage case fixedly mounted to an inner space of a rear bumper; and a bumper door rotatably provided in the rear bumper so as to open and close the storage case.

The storage case may include a lower tray fixedly mounted so as to be supported to a back beam and a rear end panel and having an article stored therein and a tray cover rotatably mounted to the lower tray to open and close the lower tray.

The bumper door and the tray cover may be integrally formed with each other.

The lower tray may be fixedly mounted so as to be seated on the support tray, a bottom surface of the support tray may be fixedly mounted so as to be seated on the top of the back beam, and a front surface of the support tray may be fixedly mounted so as to be supported to the rear end panel.

The storage apparatus for a vehicle may further include a link member of which one end is rotatably coupled to both sides of the tray cover and the other end is rotatably coupled to both sides of the support tray.

The storage apparatus for a vehicle may further include a support bracket fixedly mounted on both of the rear surface of the back beam and the bottom surface of the support tray to support a load of the storage case, together with the back beam.

The bumper door rotated to the rear of the vehicle, together with the tray cover, may be used as a step or a bench.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

4. BRIEF DESCRIPTION OF THE DRAWINGS

5. DETAILED DESCRIPTION

Figure 1:
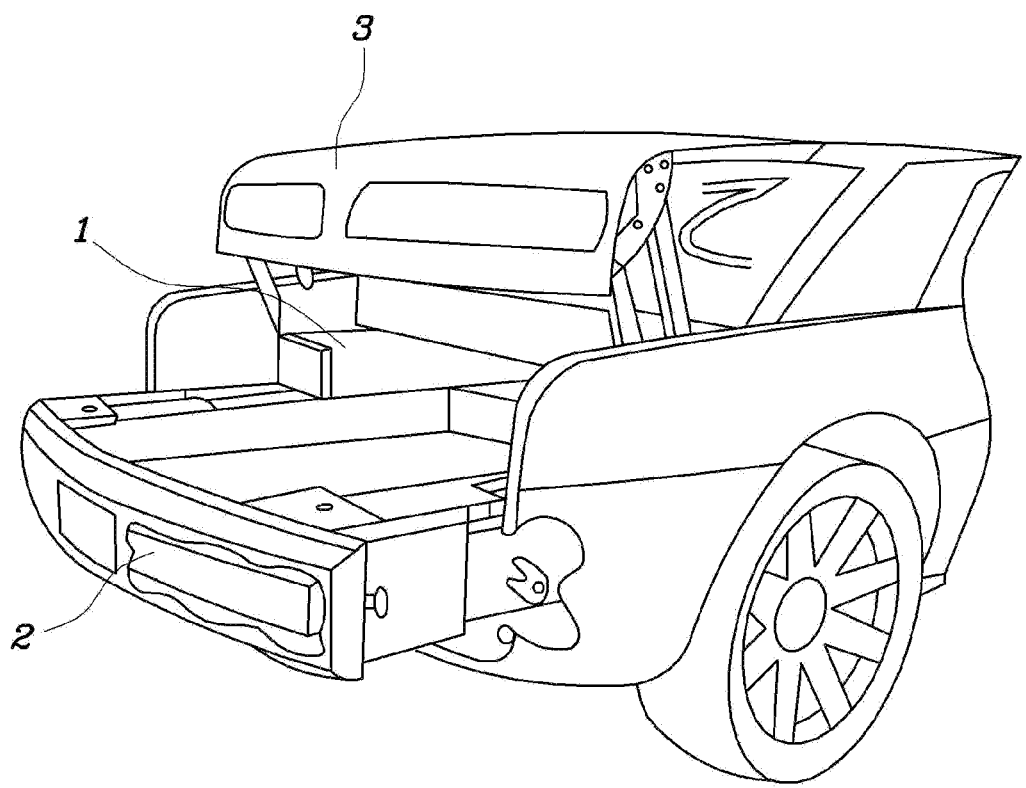
FIGS. 1 and 2 are diagrams for describing conventional exemplary storage apparatuses for a vehicle.
Figure 2:
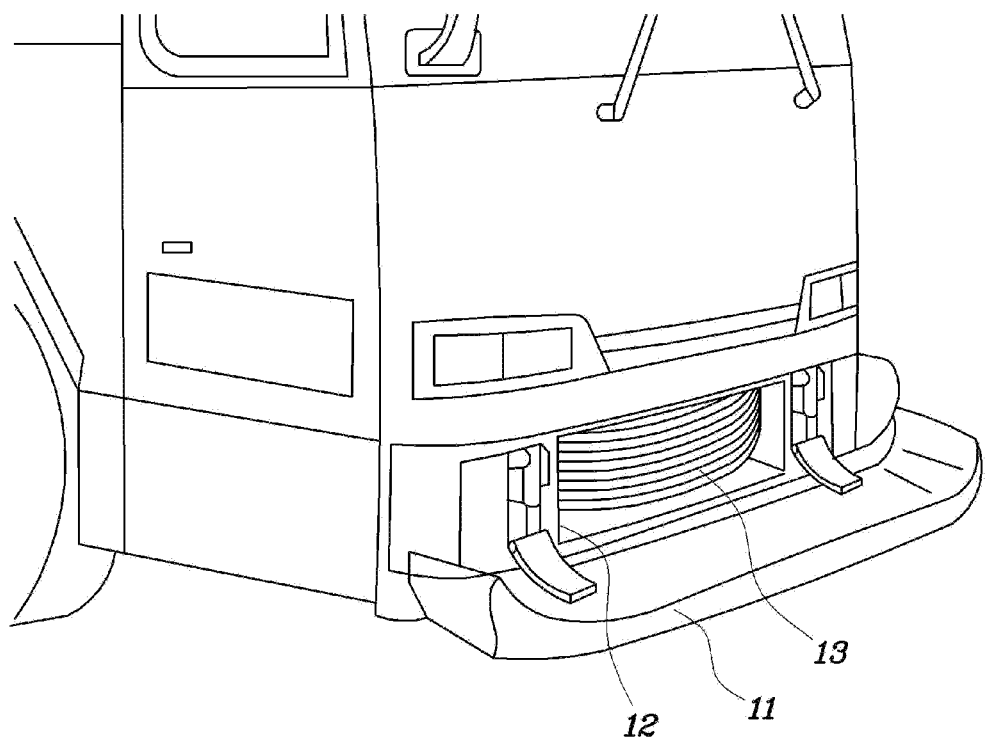

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 3 to 6, a storage apparatus for a vehicle according to various embodiments of the present invention is a structure using an inner space of a vehicle rear bumper corresponding to a spare space. The storage apparatus for a vehicle is configured to include a storage case 70 fixedly mounted to an inner space 52 of a rear bumper 51 and a bumper door 80 rotatably provided in the rear bumper 51 so as to open and close the storage case 70.

The storage case 70 is configured to include a lower tray 71 fixedly mounted so as to be supported to a back beam 53 and a rear end panel 54 and a space 71a having an article stored therein and a tray cover 72 rotatably mounted to the lower tray 71 to open and close the lower tray 71.

In this configuration, the tray cover 72 and the bumper door 80 may be integrally formed with each other so as to secure user convenience. One will appreciate that, in various embodiments, the tray cover and the bumper door may be monolithically formed.

That is, when the bumper door 80 is rotated from the rear bumper 51 to the rear of the vehicle, the tray cover 72 is rotated together. Therefore, the user rotates the bumper door 80 and then, does not need to separately rotate the tray cover 72, thereby increasing the user convenience.

The storage case 70 according to various embodiments of the present invention further includes a support tray 73. The storage case 70 has a structure in which the lower tray 71 is fixedly mounted so as to be seated on the support tray 73, a bottom surface of the support tray 73 is fixedly mounted so as to be seated on the top of the back beam 53, and a front surface of the support tray 73 is fixedly mounted so as to be supported to the rear end panel 54.

The support tray 73 is applied to supplement rigidity of the lower tray 71. In particular, when the lower tray 71 is separately coupled with the support tray 73, only the lower tray 71 may be separated. Therefore, the repairing and cleaning work may be easily performed.

Various embodiments of the present invention may have a structure in which a plurality of link members 74 are applied for the rotation operation of the tray cover 72. Various embodiments of the present invention may have a structure in which one end of the link member 74 is rotatably coupled to both sides of the tray cover 72 through a hinge 74a and the other end of the link member 74 is rotatably coupled to both sides of the support tray 73 through a hinge 74b.

Figure 6:
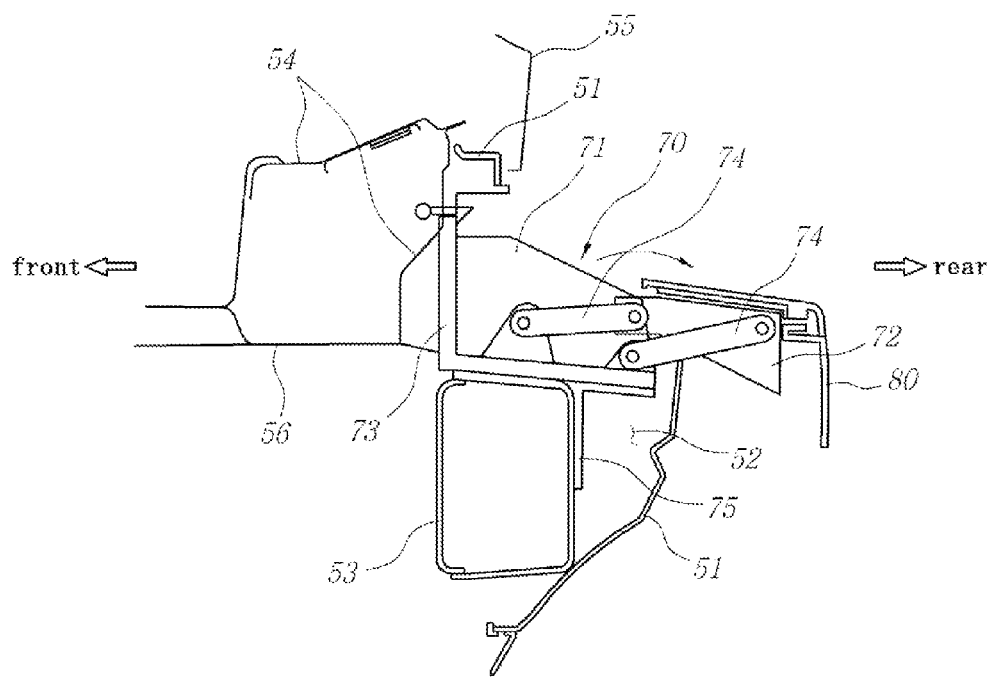
FIG. 6 is a cross-sectional view of FIG. 5.

When the lower tray 71 is opened by rotating the tray cover 72 backward as shown in FIG. 6, the front end of the tray cover 72 is stumbled by contacting the bottom end at which the hinge 74b is disposed at the link member 74 disposed at the rear thereof. Therefore, an opened angle of the tray cover 72 may be controlled.

In addition, various embodiments of the present invention further include a support bracket 75 capable of sharing a load of the storage case 70, together with the back beam 53, and supporting the storage case 70. The support bracket 75 is formed to have a cross section in a ⌐-letter shape, such that the support bracket 75 is fixedly mounted on both of the rear surface of the back beam 53 and the bottom surface of the support tray 73.

Meanwhile, when the tray cover 72 rotates backward as shown in FIG. 6 to open the lower tray 71, various embodiments of the present invention can use the bumper door 80 coupled with the tray cover 72 as the step, the bench, or the like.

Non-explained reference numeral 55 represents a trunk lid or a tail gate, reference numeral 56 represents a rear floor panel.

Figure 3:
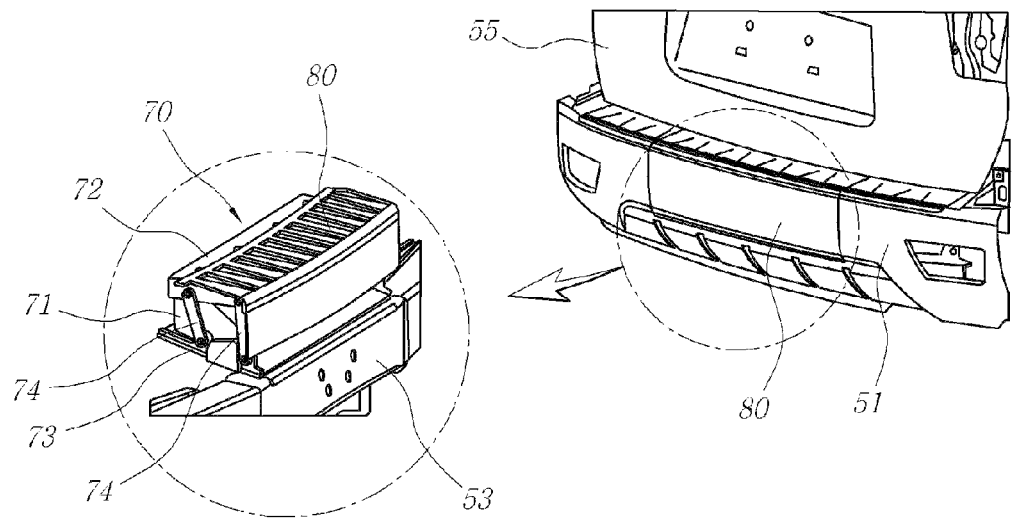
FIG. 3 is a diagram of an exemplary vehicle in which a storage apparatus according to the present invention is provided in a rear bumper.
Figure 4:
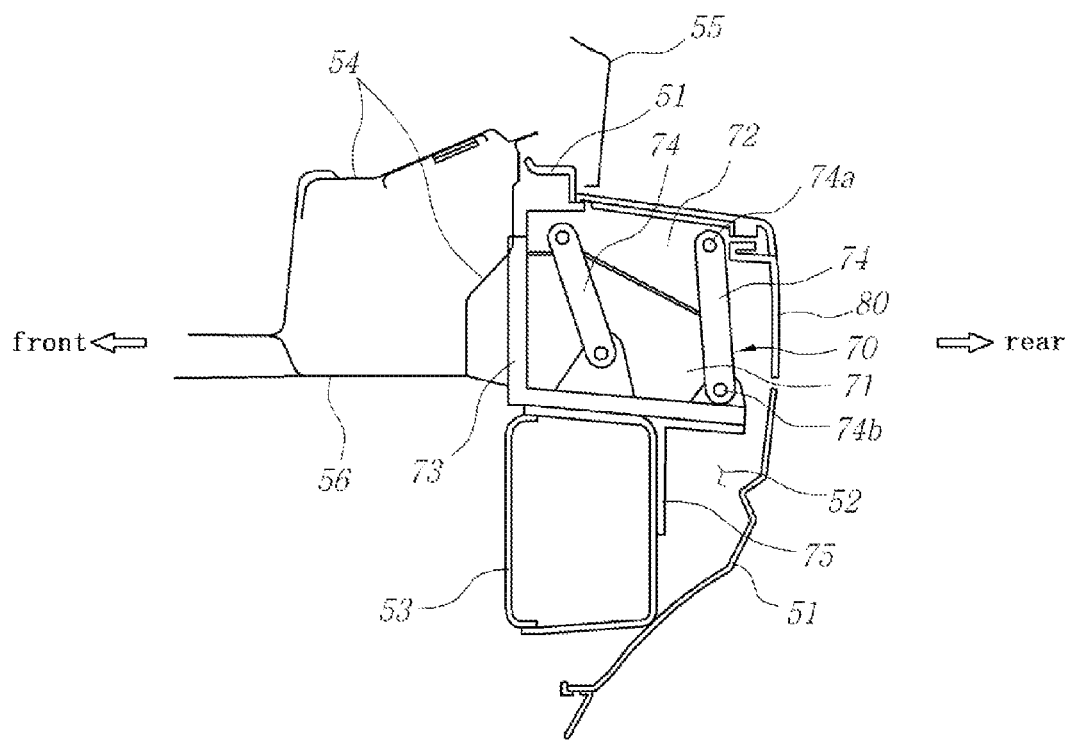
FIG. 4 is a cross-sectional view of FIG. 3.

Accordingly, as shown in FIGS. 3 and 4, when the tray cover 72 closes the lower tray 71, it is possible to accept and store necessary articles in a space 71a of the lower tray 71.

In the above-mentioned state, the tray cover 72 or the bumper door 80 maintains a state in which a motion is restricted by a separate locking apparatus.

In addition, when an external force is applied to the rear bumper 51 due to a rear collision accident in the state shown in FIGS. 3 and 4, the storage case 70 according to various embodiments of the present invention may absorb an impact while being collapsed. Therefore, the storage case 70 according to various embodiments of the present invention may have an impact absorbing function for protecting a passenger.

Figure 5:
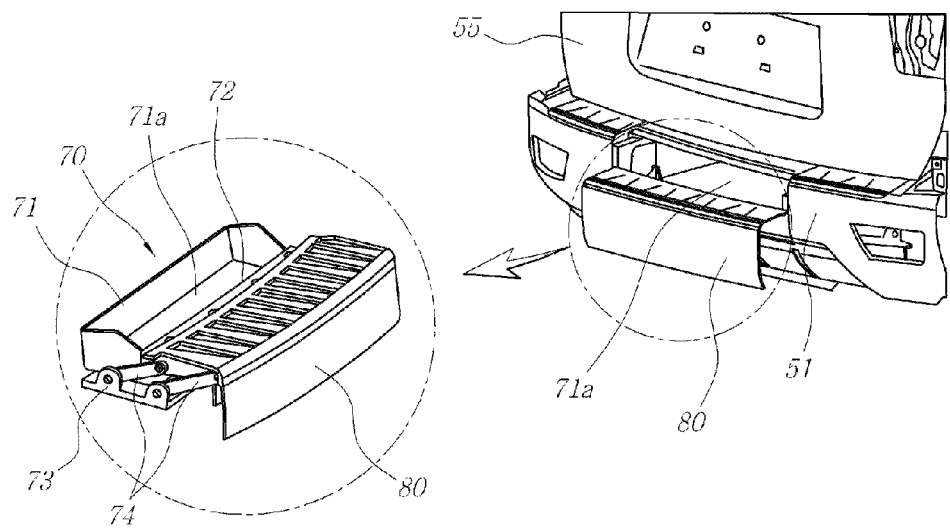
FIG. 5 is a diagram showing an operational state of an exemplary storage apparatus according to the present invention.

Further, when the locking apparatus is released and then the tray cover 72 and the bumper door 80 rotate backward as shown in FIGS. 5 and 6 to open the lower tray 71, various embodiments of the present invention may take out and use articles stored in the space 71a of the lower tray 71 or accept new articles into the space 71a.

Further, when the tray cover 72 rotates backward as shown in FIG. 6 to open the lower tray 71, various embodiments of the present invention can use the bumper door 80 coupled with the tray cover 72 as the step, the bench, or the like, or may use articles while being put the articles on the bumper door.

As described above, various embodiments of the present invention can maximize the space use of the vehicle by the structure in which the storage apparatus is mounted by using the inner space of the rear bumper 51 corresponding to the spare space, thereby improving the value of commodities of the vehicle.

In addition, the storage apparatus according to various embodiments of the present invention can use the bumper door 80 as the step or the bench or use the articles while being put the articles on the opened bumper door 80.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A storage apparatus for a vehicle, comprising:
    a storage case affixed to and defining an inner space of a rear bumper; and
    a bumper door rotatably mounted on the rear bumper so as to open and close the storage case;
    wherein the storage case includes a lower tray positioned rearward of a rear end panel and supported by a back beam, and a tray cover rotatably mounted to the lower tray to open and close the lower tray;
    wherein the lower tray includes a support tray;
    wherein a bottom surface of the support tray is seated and fixedly mounted on a top of the back beam, and
    wherein a forward surface of the support tray is supported by the rear end panel.

2. The storage apparatus for a vehicle of claim 1, wherein the bumper door and the tray cover are integrally formed with each other.

3. The storage apparatus for a vehicle of claim 1, further comprising a plurality of link members of which ends are rotatably coupled to both sides of the tray cover and the other ends are rotatably coupled to both sides of the support tray.

4. The storage apparatus for a vehicle of claim 1, further comprising a support bracket fixedly mounted on both of a rear surface of the back beam and a bottom surface of the support tray to support the storage case.

5. The storage apparatus for a vehicle of claim 1, wherein the bumper door rotate to the rear of the vehicle together with the tray cover to provide a step or a bench.

* * * * *